US010042764B2

(12) United States Patent
Bar-Joshua et al.

(10) Patent No.: US 10,042,764 B2
(45) Date of Patent: Aug. 7, 2018

(54) PROCESSING COMMANDS IN A DIRECTORY-BASED COMPUTER MEMORY MANAGEMENT SYSTEM

(71) Applicant: INTERNATIONAL BUSINESS MACHINES CORPORATION, Armonk, NY (US)

(72) Inventors: Michael Bar-Joshua, Haifa (IL); Yiftach Benjamini, Givat Ela (IL); Yaakov Gendel, Haifa (IL); Eyal Gonen, Nofit (IL); Alexander Mesh, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 15/193,390

(22) Filed: Jun. 27, 2016

(65) Prior Publication Data

US 2017/0371788 A1 Dec. 28, 2017

(51) Int. Cl.
G06F 12/00 (2006.01)
G06F 12/0817 (2016.01)
G06F 12/0842 (2016.01)

(52) U.S. Cl.
CPC ...... *G06F 12/0828* (2013.01); *G06F 12/0842* (2013.01); *G06F 2212/60* (2013.01); *G06F 2212/621* (2013.01)

(58) Field of Classification Search
CPC ............ G06F 12/0828; G06F 12/0842; G06F 2212/60; G06F 2212/621
See application file for complete search history.

(56) References Cited

U.S. PATENT DOCUMENTS 5,995,967 A * 11/1999 Iacobovici ........ G06F 17/30958
7,418,543 B2 * 8/2008 Jain ........................ G11C 15/00
365/49.1
2014/0317358 A1 10/2014 Meier et al.
2015/0205725 A1 7/2015 Al-Otoom et al.

* cited by examiner

*Primary Examiner* — Kalpit Parikh
(74) *Attorney, Agent, or Firm* — L. Jeffrey Kelly

(57) ABSTRACT

A method for processing commands in a directory-based computer memory management system includes receiving a command to perform an operation on data stored in a set of one or more computer memory locations associated with an entry in a directory of a computer memory, the entry is associated with an indicator for indicating whether the set of one or more computer memory locations is busy, a head tag, and a tail tag. The command is associated with a command tag and a predecessor tag, and checking the indicator to determine whether the set of one or more computer memory locations is busy.

20 Claims, 5 Drawing Sheets

| CONDITIONS | 216 | 218 | 220 | 222 | 224 |
|---|---|---|---|---|---|
| DIRECTORY ENTRY INDICATOR INDICATES MEMORY LOCATION SET IS BUSY | NO | YES | NO | YES | YES / NO |
| COMMAND IS THE ONLY COMMAND PENDING FOR THE MEMORY LOCATION SET | YES | | | | |
| COMMAND WAS PREVIOUSLY REJECTED | | NO | | YES | |
| DIRECTORY ENTRY HEAD TAG MATCHES PREDECESSOR TAG OF COMMAND | | | YES | | NO |
| ACTIONS | | | | | |
| SET DIRECTORY ENTRY HEAD TAG EQUAL TO | COMMAND TAG | | COMMAND TAG | | |
| SET PREDECESSOR TAG OF COMMAND EQUAL TO | | TAIL TAG | | | |
| SET DIRECTORY ENTRY TAIL TAG EQUAL TO | COMMAND TAG | COMMAND TAG | | | |
| ACCEPT/REJECT COMMAND | ACCEPT | REJECT | ACCEPT | REJECT | REJECT |
| SET DIRECTORY ENTRY INDICATOR TO BUSY | YES | | YES | | |

PROCESSING COMMANDS IN A DIRECTORY-BASED COMPUTER MEMORY MANAGEMENT SYSTEM

BACKGROUND

The present invention generally relates to directory-based cache management techniques, and more particularly, to a method for processing commands in a directory-based computer memory management system.

Directory-based cache management techniques typically require that commands to perform operations on the same cached data be executed in the order in which the commands were issued. For example, if a command to write to a cache line is issued before a command to read the same cache line, it is expected that the read returns the data written by the preceding write command.

SUMMARY

In one aspect of the present invention a method is provided for processing commands in a directory-based computer memory management system, the method includes receiving a command to perform an operation on data stored in a set of one or more computer memory locations, where the set of one or more computer memory locations is associated with an entry in a directory of the computer memory, where the entry is associated with an indicator for indicating whether the set of one or more computer memory locations is busy or not busy, a head tag, and a tail tag, and where the command is associated with a command tag and a predecessor tag, checking the indicator to determine whether the set of one or more computer memory locations is busy or not busy, if the indicator indicates that the set of one or more computer memory locations is not busy, and the command is the only command pending that involves the set of one or more computer memory locations, setting both the head tag and the tail tag equal to the command tag, setting the indicator to indicate that the set of one or more computer memory locations is busy, and accepting the command, if the indicator indicates that the set of one or more computer memory locations is busy, and the command has not been previously rejected, setting the predecessor tag equal to the tail tag, setting the tail tag equal to the command tag, and rejecting the command, and if the indicator indicates that the set of one or more computer memory locations is not busy, and the head tag matches the predecessor tag, setting the head tag equal to the command tag, setting the indicator to indicate that the set of one or more computer memory locations is busy, and accepting the command.

In other aspects of the invention, systems and computer program products embodying the invention are provided.

BRIEF DESCRIPTION OF THE DRAWINGS

The following detailed description, given by way of example and not intended to limit the invention solely thereto, will best be appreciated in conjunction with the accompanying drawings, in which:

FIGS. 2A-2B depict a simplified flowchart illustration and a simplified decision table, respectively, describing an exemplary method of operation of the system of FIG. 1, according to an embodiment of the present invention;

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

When implementing a directory based data cache, it is required that different commands to the exact same cached data be performed in the order in which they were issued. For example, if a read to a cache line is issued after a write to the same cache line, it is expected that the read returns the data written by the preceding command. One execution ordering solution includes, for example, the implementation of a P8 PSL design. In such a case, when the P8 PSL design identifies that a second command to a cache line is processing a previous command, simply halts processing of all new commands until the first command execution is finished. This technique, while maintaining the execution order of commands has a heavy impact on the overall cache performance. Another execution ordering solution may include implementing an external mechanism to handle the command execution ordering.

Embodiments of the present disclosure aims to solve the command execution ordering issue with little or no impact on the overall cache performance by creating a dynamic linked list to enforce execution order, the dynamic linked list is maintained in the cache line's directory entry. Commands received requiring a cache line that already has a command working on it are rejected to be executed at a later time. The cache line pipe is not stalled due to conflicting commands, new commands which access non-contended lines may proceed to execution. As such, the ordering mechanism is implemented in the cache directory itself avoiding the need to have an external ordering mechanism.

Figure 1:
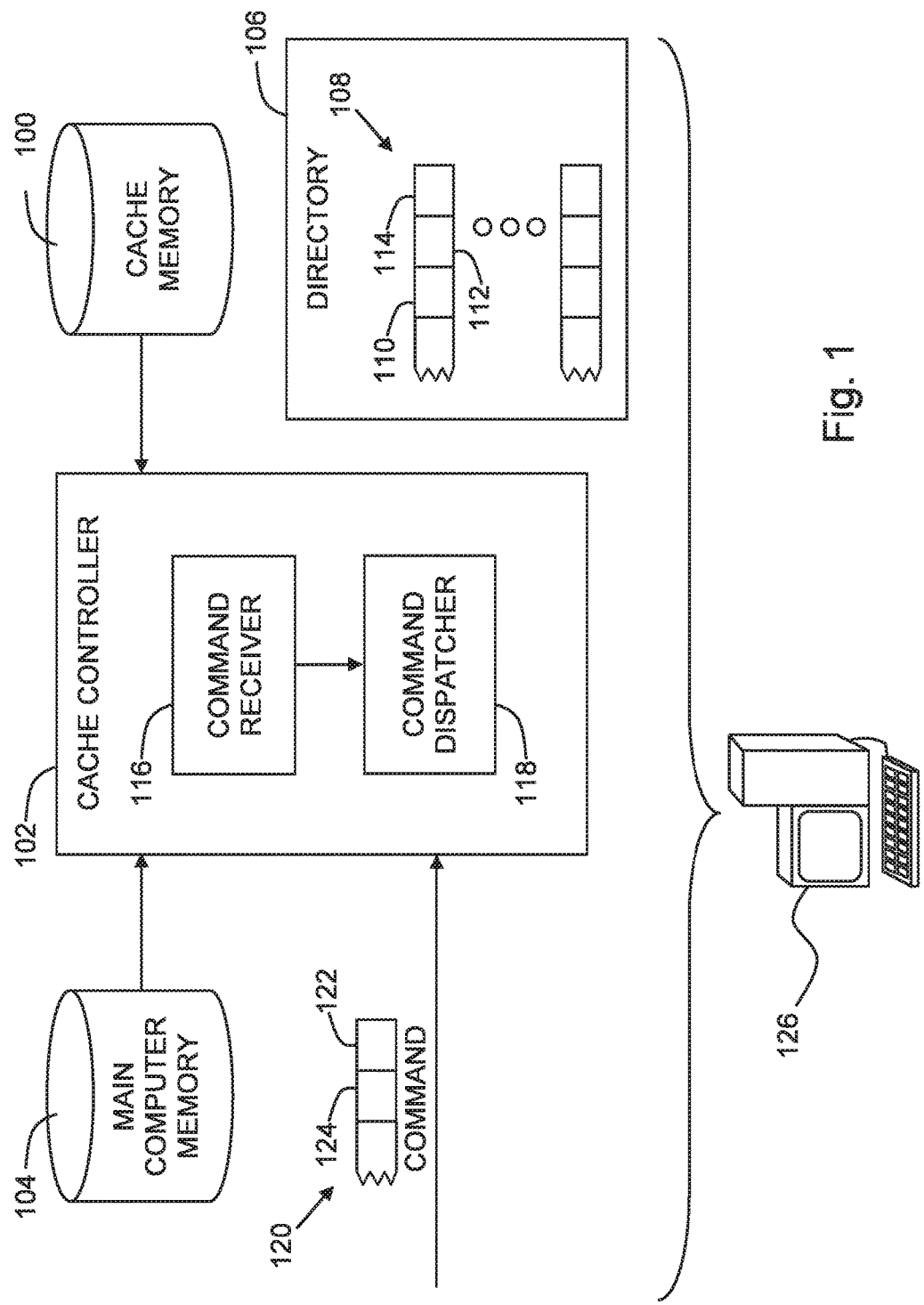
FIG. 1 is a simplified conceptual illustration of a system for processing commands in a directory-based computer memory management system, according to an embodiment of the present invention.

Referring now to FIG. 1, a simplified conceptual illustration of a system for processing commands in a directory-based computer memory management system is shown, according to an embodiment of the present invention. In the system of FIG. 1, a cache memory 100 of a computer is managed by a cache controller 102, which maps between a main computer memory 104 and the cache memory 100 by maintaining a directory 106 in accordance with conventional directory-based cache management techniques. The directory 106 preferably includes separate entries 108, also known as cache line entries, where each entry 108 maps between a set of one or more locations in the main computer memory 104 and a corresponding set of locations in the cache memory 100 into which are copied the contents of the set of locations in the main computer memory 104.

Each entry 108 in the directory 106 is associated with an indicator 110 for indicating whether or not the set of locations in the cache memory 100, to which entry 108 maps, is busy, for example, an operation is currently being performed that involves the set of locations in the cache memory 100. Each entry 108 in the directory 106 is also associated with a head tag 112 and a tail tag 114.

The cache controller 102 is preferably configured with a command receiver 116 for receiving commands to perform operations on data, and a command dispatcher 118 for processing the commands, where each of such operations is to be carried out on a set of one or more locations in the cache memory 100 after data required for the operation is copied into the cache memory 100 from the main computer memory 104. Each command received by the command receiver 116, such as a command 120, is associated with a command tag 122 that uniquely identifies the command, and is associated with a predecessor tag 124 as well.

When the command 120 is received by the command receiver 116, the command receiver 116 searches the directory 106 to determine whether an entry 108 exists that corresponds to a set of locations in the cache memory 100 into which have been copied data required for the operation indicated by the command 120. If such an entry 108 exists, the command receiver 116 forwards the command 120 to the command dispatcher 118 for processing as will be described in detail below.

If no entry 108 exists, the command receiver 116 creates an entry 108 in the directory 106 to establish a map between the set of locations in the main computer memory 104, whose data is required for the operation indicated by command 120, and a corresponding set of locations in the cache memory 100. The command receiver 116 sets the indicator 110 of the entry 108 to indicate that the set of locations in the cache memory 100 is busy, and sets both the head tag 112 and the tail tag 114 of the entry 108 equal to the command tag 122 of the command 120. The required data is then copied into the set of locations in the cache memory 100 indicated by entry 108 in accordance with conventional techniques. After the data has been copied into the cache memory 100, the command receiver 116 sets the indicator 110 of entry 108 to indicate that the set of locations in the cache memory 100 is not busy. The command receiver 116 forwards the command 120 to the command dispatcher 118 after the entry 108 is created and its indicator 110, head tag 112, and tail tag 114 are set as described above.

When the command 120 is received by the command dispatcher 118, the command dispatcher 118 accesses the entry 108 in the directory 106 that corresponds to the set of locations in the cache memory 100 where the data required for the operation indicated by the command 120 is stored. The command dispatcher 118 checks the indicator 110 of the entry 108 to determine whether the set of locations in the cache memory 100 is busy or not busy, whereupon:

If the indicator 110 indicates that the set of memory locations is not busy, and the command 120 is the only command pending that involves the set of memory locations, it may be determined that both the head tag 112 and the tail tag 114 of entry 108 are equal to the command tag 122 of the command 120, the command dispatcher 118 sets the indicator 110 to indicate that the set of memory locations is busy, and accepts the command 120, thereby allowing the operation to be performed.

If indicator the 110 indicates that the set of memory locations is busy, and the command 120 has not been previously rejected, it may be determined that its predecessor tag 124 has not been set, the command dispatcher 118 sets the predecessor tag 124 equal to the tail tag 114, sets the tail tag 114 equal to the command tag 122, and rejects the command 120, thereby preventing the operation from being performed.

If the indicator 110 indicates that the set of memory locations is not busy, and the head tag 112 matches the predecessor tag 124, the command dispatcher 118 sets the head tag 112 equal to the command tag 122, sets the indicator 110 to indicate that the set of memory locations is busy, and accepts the command 120, thereby allowing the operation to be performed.

If the indicator 110 indicates that the set of memory locations is busy, and the command 120 has been previously rejected, the command dispatcher 118 rejects the command 120, thereby preventing the operation from being performed.

It should be noted that whether the indicator 110 indicates that the set of memory locations is busy or not, when the head tag 112 is not equal to the predecessor tag 124, the command dispatcher 118 rejects the command 120, thereby preventing the operation from being performed.

The command dispatcher 118 preferably sets the indicator 110, upon completion of the operation for a given command that involves a given set of locations in the cache memory 100, to indicate that the given set of memory locations is not busy.

According to embodiments of the present invention, if one or more commands to perform operations involving a given set of locations in the main computer memory 104 are received by the command receiver 116 during a time when one or more other commands to perform operations involving the same set of locations in the main computer memory 104 are pending (i.e., these other commands were previously received by the command receiver 116 and their operations have not been completed), the command dispatcher 118 is configured to cause all of the above commands to be accepted and their operations performed in the order in which the commands were received by the command receiver 116. Moreover, any mechanism may be used to determine an order in which rejected commands are resubmitted to the command dispatcher 118 and when they are resubmitted to the command dispatcher 118, and, whichever mechanism is used, the command dispatcher 118 may cause commands to be accepted and their operations performed in the order in which the commands were received by the command receiver 116.

The command dispatcher 118 is preferably configured to concurrently maintain separate orders of operation for commands involving different sets of locations in the cache memory 100, thereby allowing operations to be performed on different sets of memory locations in accordance with conventional parallel processing or concurrent processing techniques.

It should be noted that any of the elements shown in FIG. 1 may preferably be implemented by one or more computers, such as computer 126, in a computer hardware and/or in a computer software embodied in a non-transitory, computer-readable medium in accordance with conventional techniques.

Figure 2A:
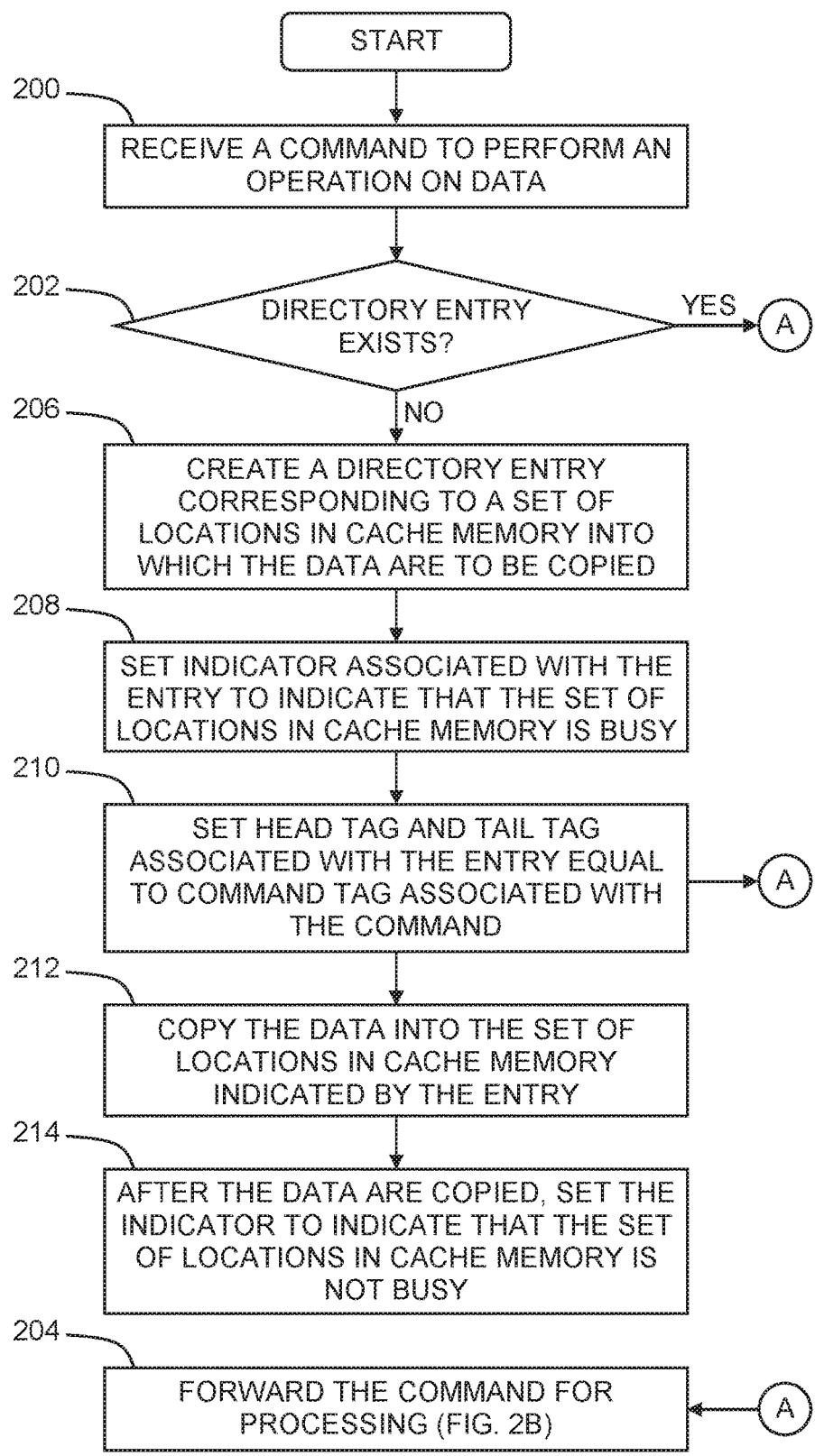

Referring now to FIGS. 2A-2B, an exemplary method for processing commands in a directory-based computer memory management system is described, according to an embodiment of the present invention. In this embodiment, FIG. 2A is a simplified flowchart describing the steps of the exemplary method, and FIG. 2B is a simplified decision table.

With continued reference to FIGS. 2A-2B, a command is received to perform an operation on data (step 200). If a directory entry exists that corresponds to a set of locations in a cache memory into which the data have been copied (step 202), the command is forwarded for processing (FIG. 2B). If no directory entry exists, a directory entry is created to correspond to a set of locations in the cache memory into which the data is to be copied (step 206). An indicator associated with the entry is set to indicate that the set of locations in the cache memory is busy (step 208). A head tag and a tail tag associated with the entry are set equal to the command tag of the command (step 210), and the command is forwarded for processing (step 204). The data is copied into the set of locations in the cache memory indicated by the entry (step 212). After the data has been copied into the cache memory, the indicator of the entry is set to indicate that the set of locations in the cache memory is not busy (step 214).

Processing of the command continues as shown in FIG. 2B, where the indicator associated with the entry is checked to determine whether the set of locations in the cache memory is busy or not busy. If an indicator of a directory entry that corresponds to the set of locations indicates that the set of memory locations is not busy, and the command is the only command pending involving the set of memory locations, then the head tag and the tail tag of the directory entry are both set equal to the command tag of the command, the indicator is set to indicate that the set of memory locations is busy, and the command is accepted (column 216). If the indicator of the directory entry that corresponds to the set of locations indicates that the set of memory locations is busy, and the command has not been previously rejected, the predecessor tag of the command is set equal to the tail tag of the directory entry, the tail tag of the directory entry is then set equal to the command tag of the command, and the command is rejected (column 218). If the indicator of the directory entry that corresponds to the set of locations indicates that the set of memory locations is not busy, and the head tag of the directory entry is equal to the predecessor tag of the command, the head tag of the directory entry is set equal to the command tag of the command, the indicator is set to indicate that the set of memory locations is busy, and the command is accepted (column 220). If the indicator of the directory entry that corresponds to the set of locations indicates that the set of memory locations is busy, and the command was previously rejected, the command is rejected (column 222). Whether the indicator of the directory entry that corresponds to the set of locations indicates that the set of memory locations is busy or not, when the head tag of the directory entry is not equal to the predecessor tag of the command, the command is rejected (column 224).

The system for processing commands of FIG. 1 and the exemplary method of FIGS. 2A-2B may further be appreciated in the context of the simplified example shown in FIG. 3 below.

Figure 3:
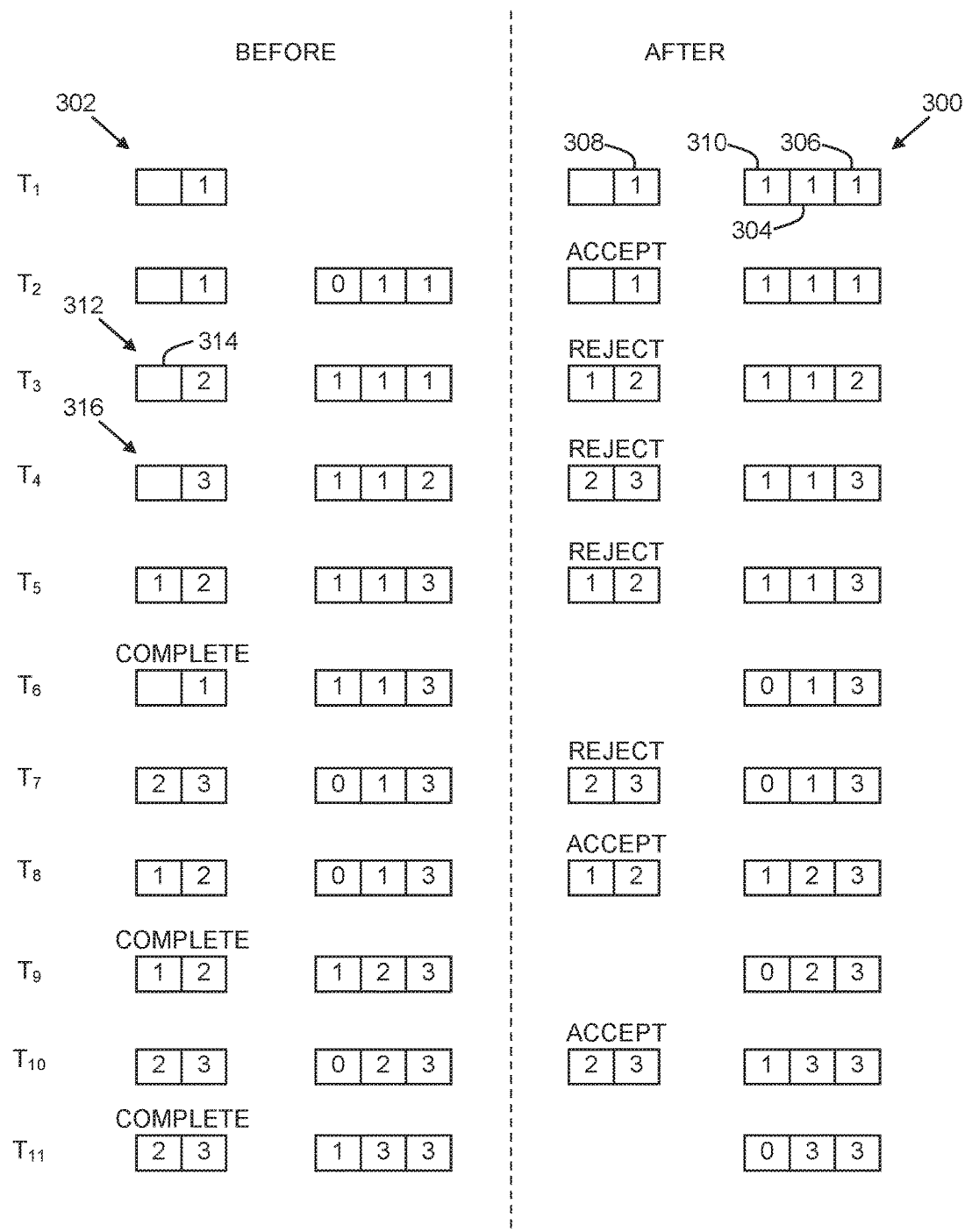
FIG. 3 is a simplified example showing the state of a directory entry at various times with respect to the processing of various commands in accordance with the system of FIG. 1 and method of FIGS. 2A-2B.

Referring now to FIG. 3, a state of a directory entry at various times with respect to the processing of commands is shown, according to an embodiment of the present invention. While only those portions of the directory entry and the various command that relate to the invention are shown, it may be appreciated that the directory entry and the various commands may include additional information in accordance with conventional directory-based cache management techniques.

A directory entry 300 is shown after its creation subsequent to the receipt of a first command 302 at time index T1 to perform an operation on data that is copied into a set of locations in a cache memory referred to by entry 300. A head tag 304 and a tail tag 306 that are included in entry 300 are shown as set equal to the value '1' of a command tag 308 that uniquely identifies first command 302, thereby indicating that first command 302 is the only command pending for the set of locations in the cache memory referred to by entry 300. An indicator 310 that is also included in entry 300 is shown as set equal to '1' to indicate that the set of locations in cache memory referred to by entry 300 is currently "busy", and thus the operation of first command 302 cannot yet be performed.

At time index T2, an indicator 310 is shown as set equal to '0' to indicate that the set of locations in cache memory referred to by entry 300 is currently "not busy". First command 302 is still the only command pending, as both head tag 304 and tail tag 306 of entry 300 are shown as set equal to the value '1' of command tag 308 of the first command 302, and thus the first command 302 may now be accepted. The indicator 310 is set equal to '1' to indicate that the set of locations in the cache memory referred to by entry 300 is currently busy, and the operation of the first command 302 is performed.

At time index T3, a second command 312 is received to perform an operation involving the same set of locations in the cache memory referred to by entry 300. The indicator 310 is shown as set equal to '1', indicating that the set of locations in the cache memory referred to by entry 300 is currently busy. As the second command 312 was not previously rejected, and its predecessor tag 314 has not yet been set, the tail tag 306 of entry 300 is set equal to the value '2' of the command tag 308 of the second command 312, the predecessor tag 314 of the second command 312 is set equal to the head tag 304 of entry 300, and the second command 312 is rejected.

At time index T4, a third command 316 is received to perform an operation involving the same set of locations in the cache memory referred to by entry 300. The indicator 310 is shown as set equal to '1', indicating that the set of locations in the cache memory referred to by entry 300 is currently busy. As a third command 316 was not previously rejected, and its predecessor tag 314 has not yet been set, the tail tag 306 of entry 300 is set equal to the value '3' of the command tag 308 of the third command 316, the predecessor tag 314 of the third command 316 is set equal to head tag 304 of entry 300, and the third command 316 is rejected.

At time index T5, the second command 312 is again received. The indicator 310 is shown as set equal to '1', indicating that the set of locations in the cache memory referred to by entry 300 is currently busy. As the second command 312 was previously rejected, and its predecessor tag 314 has been set, the second command 312 is rejected.

At time index T6, the operation of the first command 302 has been completed, whereupon indicator 310 is set equal to '0' to indicate that the set of locations in the cache memory referred to by entry 300 is currently available (not busy).

At time index T7, the third command 316 is again received. While the indicator 310 is shown as set equal to '0', indicating that the set of locations in the cache memory referred to by entry 300 is currently not busy, whereupon the third command 316 is rejected.

At time index T8, the second command 312 is again received. The indicator 310 is shown as set equal to '0', indicating that the set of locations in the cache memory referred to by entry 300 is currently not busy. As the predecessor tag 314 of the second command 312 matches the head tag 304 of entry 300, the second command 312 may now be accepted. The head tag 304 of entry 300 is set equal to the value '2' of the command tag 308 of the second command 312, the indicator 310 is set equal to '1' to indicate that the set of locations in the cache memory referred to by entry 300 is currently busy, and the operation of second command 312 is performed.

At time index T9, the operation of the second command 312 has been completed, whereupon the indicator 310 is set equal to '0' to indicate that the set of locations in the cache memory referred to by entry 300 is currently not busy.

At time index T10, the third command 316 is again received. The indicator 310 is shown as set equal to '0', indicating that the set of locations in the cache memory referred to by entry 300 is currently not busy. As the predecessor tag 314 of the third command 316 matches the head tag 304 of entry 300, the third command 316 may now be accepted. The head tag 304 of entry 300 is set equal to the value '3' of the command tag 308 of the third command 316, the indicator 310 is set equal to '1' to indicate that the set of locations in the cache memory referred to by entry 300 is currently busy, and the operation of the third command 316 is performed.

At time index T11, the operation of the third command 316 has been completed, whereupon the indicator 310 is set equal to '0' to indicate that the set of locations in the cache memory referred to by entry 300 is currently not busy.

Therefore, embodiments of the present invention provide a method, system and computer program product for processing commands based on a directory-based cache structure (e.g., single directory entry, Cache Line Entry or CLE) in which a cache controller receives commands from a single source. Each command requests either read or write access to a specific cache line which is identified by an address. Each command is identified by a unique tag. The cache controller maintains a directory structure which logs all cache lines currently available in the cache. When the controller receives a command it first accesses its directory to check if the required cache line is available in its associated cache. If the required cache line is available then this is considered a "cache hit" and the command is processed immediately. If the cache line is not in the data cache, then this considered a "cache miss" and a process to retrieve the line into the cache is initialized. Once the line is brought into the cache the command is processed as if it is a "hit".

Embodiments of the present disclosure may provide a method, system and computer program product for processing commands in a directory-based computer memory management system including the steps of: receiving a command to perform an operation on data stored in a set of one or more computer memory locations, where the set of one or more computer memory locations is associated with an entry in a directory of a computer memory, the entry is associated with an indicator for indicating whether the set of one or more computer memory locations is busy, a head tag, and a tail tag; the command is associated with a command tag and a predecessor tag; and checking the indicator to determine whether the set of one or more computer memory locations is busy. The method, system and computer program product further includes setting both the head tag and the tail tag equal to the command tag, in response to the indicator indicating that the set of one or more computer memory locations is not busy, and the command being the only command pending that involves the set of one or more computer memory locations; setting the indicator to indicate that the set of one or more computer memory locations is busy; accepting the command, where accepting the command includes allowing the operation to be performed; and setting the indicator, upon completion of the operation, to indicate that the set of one or more computer memory locations is not busy. The method, system and computer program product further includes setting the predecessor tag equal to the tail tag, in response to the indicator indicating that the set of one or more computer memory locations is busy, and the command is not rejected; setting the tail tag equal to the command tag; and rejecting the command. The method, system and computer program product further includes setting the head tag equal to the command tag, in response to the indicator indicating that the set of one or more computer memory locations is not busy, and the head tag matching the predecessor tag; setting the indicator to indicate that the set of one or more computer memory locations is busy; accepting the command, where accepting the command includes allowing the operation to be performed; and setting the indicator, upon completion of the operation, to indicate that the set of one or more computer memory locations is not busy. The method, system and computer program product further includes rejecting the command, in response to the indicator indicating that the set of one or more computer memory locations is busy and the command has been previously rejected. The method, system and computer program product further includes rejecting the command in response to the indicator indicating that the set of one or more computer memory locations is not busy and the head tag being not equal to the predecessor tag.

Figure 4:
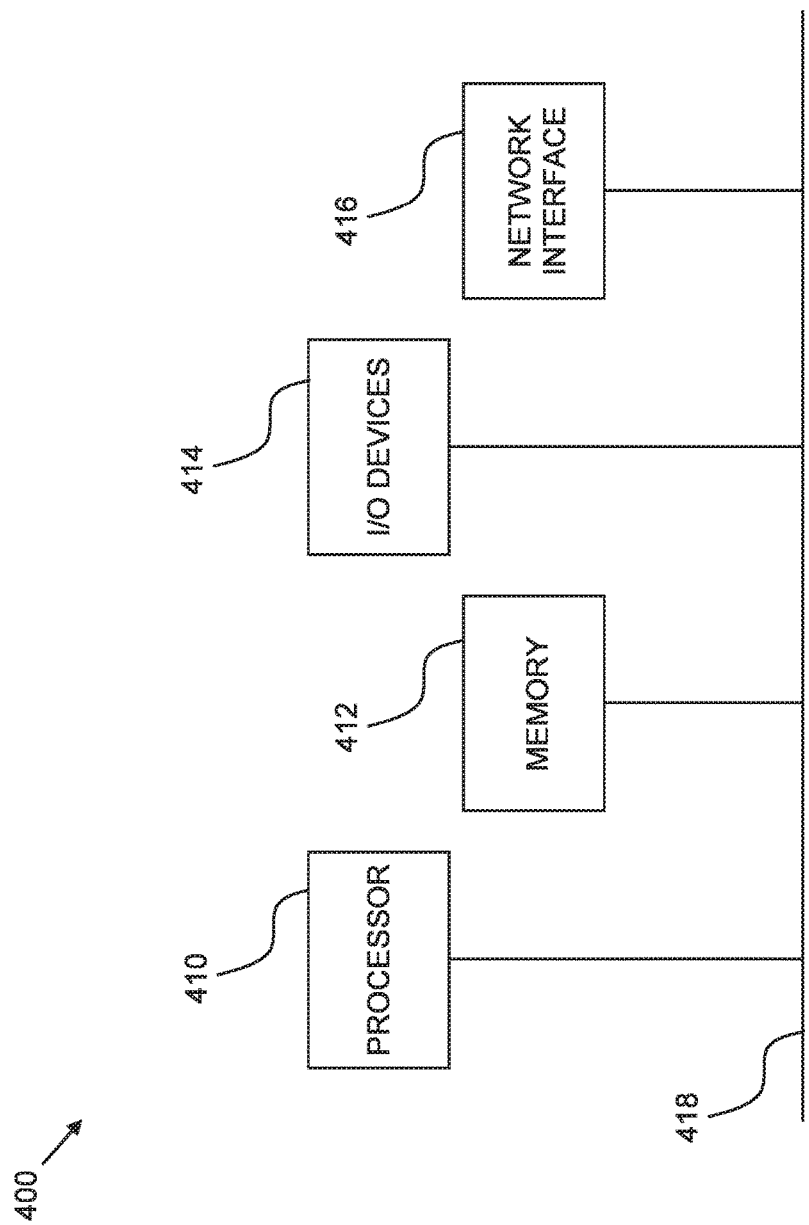
FIG. 4 is a simplified block diagram illustration of an exemplary hardware implementation of a computing system, according to an embodiment of the present invention.

Referring now to FIG. 4, a block diagram 400 illustrates an exemplary hardware implementation of a computing system in accordance with which one or more components/methodologies of the invention (e.g., components/methodologies described in the context of FIG. 1 and FIGS. 2A-2B) may be implemented, according to an embodiment of the present invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method for processing commands in a directory-based computer memory management system, the method comprising:

receiving a command to perform an operation on data stored in a set of one or more computer memory locations,
   wherein the set of one or more computer memory locations is associated with an entry in a directory of a computer memory,
   wherein the entry is associated with
      an indicator for indicating whether the set of one or more computer memory locations is busy,
      a head tag, and
      a tail tag, and
   wherein the command is associated with
      a command tag and
      a predecessor tag;
searching the directory to determine whether the entry exist in the directory;
based on the entry not existing in the directory, creating an entry corresponding to the set of one or more computer memory locations, wherein data from the set of one or more computer memory locations is required for processing the command;
checking the indicator to determine whether the set of one or more computer memory locations is busy; and
based on the set of one or more computer memory locations being busy and the head tag being not equal to the predecessor tag, rejecting the command.

2. The method of claim 1, further comprising:
setting both the head tag and the tail tag equal to the command tag, in response to the indicator indicating that the set of one or more computer memory locations is not busy, and the command being the only command pending that involves the set of one or more computer memory locations;
setting the indicator to indicate that the set of one or more computer memory locations is busy;
accepting the command, wherein accepting the command comprises allowing the operation to be performed; and
setting the indicator, upon completion of the operation, to indicate that the set of one or more computer memory locations is not busy.

3. The method of claim 1, further comprising:
setting the predecessor tag equal to the tail tag, in response to the indicator indicating that the set of one or more computer memory locations is busy, and the command is not rejected;
setting the tail tag equal to the command tag; and
rejecting the command.

4. The method of claim 1, further comprising:
setting the head tag equal to the command tag, in response to the indicator indicating that the set of one or more computer memory locations is not busy, and the head tag matching the predecessor tag;
setting the indicator to indicate that the set of one or more computer memory locations is busy;
accepting the command, wherein accepting the command comprises allowing the operation to be performed; and
setting the indicator, upon completion of the operation, to indicate that the set of one or more computer memory locations is not busy.

5. The method of claim 1 further comprising:
rejecting the command, in response to the indicator indicating that the set of one or more computer memory locations is busy and the command has been previously rejected.

6. The method of claim 1, further comprising:
rejecting the command in response to the indicator indicating that the set of one or more computer memory locations is not busy and the head tag being not equal to the predecessor tag.

7. The method of claim 1 wherein the computer memory is a cache memory and the entry is a cache line entry.

8. A system for processing commands in a directory-based computer memory management system, the system comprising:
   a memory device;
   an output device; and
   a processing unit in communications with the memory device and the output device, wherein the system is configured to perform a method comprising:
      receiving a command to perform an operation on data stored in a set of one or more computer memory locations,
         wherein the set of one or more computer memory locations is associated with an entry in a directory of a computer memory,
         wherein the entry is associated with
            an indicator for indicating whether the set of one or more computer memory locations is busy,
            a head tag, and
            a tail tag, and
         wherein the command is associated with
            a command tag and
            a predecessor tag;
      searching the directory to determine whether the entry exist in the directory;
      based on the entry not existing in the directory, creating an entry corresponding to the set of one or more computer memory locations, wherein data from the set of one or more computer memory locations is required for processing the command;
      checking the indicator to determine whether the set of one or more computer memory locations is busy; and
      based on the set of one or more computer memory locations being busy and the head tag being not equal to the predecessor tag, rejecting the command.

9. The system of claim 8, further comprising:
setting both the head tag and the tail tag equal to the command tag, in response to the indicator indicating that the set of one or more computer memory locations is not busy, and the command being the only command pending that involves the set of one or more computer memory locations;
setting the indicator to indicate that the set of one or more computer memory locations is busy;
accepting the command, wherein accepting the command comprises allowing the operation to be performed; and
setting the indicator, upon completion of the operation, to indicate that the set of one or more computer memory locations is not busy.

10. The system of claim 8, further comprising:
setting the predecessor tag equal to the tail tag, in response to the indicator indicating that the set of one or more computer memory locations is busy, and the command is not rejected;
setting the tail tag equal to the command tag; and
rejecting the command.

11. The system of claim 8, further comprising:
setting the head tag equal to the command tag, in response to the indicator indicating that the set of one or more computer memory locations is not busy, and the head tag matching the predecessor tag;

setting the indicator to indicate that the set of one or more computer memory locations is busy;
accepting the command, wherein accepting the command comprises allowing the operation to be performed; and
setting the indicator, upon completion of the operation, to indicate that the set of one or more computer memory locations is not busy.

12. The system of claim 8, further comprising:
rejecting the command, in response to the indicator indicating that the set of one or more computer memory locations is busy and the command has been previously rejected.

13. The system of claim 8, further comprising:
rejecting the command in response to the indicator indicating that the set of one or more computer memory locations is not busy and the head tag being not equal to the predecessor tag.

14. The system of claim 8, wherein the computer memory is a cache memory and the entry is a cache line entry.

15. A computer program product for processing commands in a directory-based computer memory management system, the computer program product comprising:
a non-transitory, computer-readable storage medium; and
computer-readable program code embodied in the storage medium, wherein the computer-readable program code is capable of performing a method comprising:
receiving a command to perform an operation on data stored in a set of one or more computer memory locations,
wherein the set of one or more computer memory locations is associated with an entry in a directory of a computer memory,
wherein the entry is associated with
an indicator for indicating whether the set of one or more computer memory locations is busy,
a head tag, and
a tail tag, and
wherein the command is associated with
a command tag and
a predecessor tag;
searching the directory to determine whether the entry exist in the directory;
based on the entry not existing in the directory, creating an entry corresponding to the set of one or more computer memory locations, wherein data from the set of one or more computer memory locations is required for processing the command;
checking the indicator to determine whether the set of one or more computer memory locations is busy; and
based on the set of one or more computer memory locations being busy and the head tag being not equal to the predecessor tag, rejecting the command.

16. The computer program product of claim 15, further comprising
setting both the head tag and the tail tag equal to the command tag, in response to the indicator indicating that the set of one or more computer memory locations is not busy, and the command being the only command pending that involves the set of one or more computer memory locations;
setting the indicator to indicate that the set of one or more computer memory locations is busy;
accepting the command, wherein accepting the command comprises allowing the operation to be performed; and
setting the indicator, upon completion of the operation, to indicate that the set of one or more computer memory locations is not busy.

17. The computer program product of claim 15, further comprising:
setting the predecessor tag equal to the tail tag, in response to the indicator indicating that the set of one or more computer memory locations is busy, and the command is not rejected;
setting the tail tag equal to the command tag; and
rejecting the command.

18. The computer program product of claim 15, further comprising:
setting the head tag equal to the command tag, in response to the indicator indicating that the set of one or more computer memory locations is not busy, and the head tag matching the predecessor tag;
setting the indicator to indicate that the set of one or more computer memory locations is busy;
accepting the command, wherein accepting the command comprises allowing the operation to be performed; and
setting the indicator, upon completion of the operation, to indicate that the set of one or more computer memory locations is not busy.

19. The computer program product of claim 15, further comprising:
rejecting the command, in response to the indicator indicating that the set of one or more computer memory locations is busy and the command has been previously rejected.

20. The computer program product of claim 15, further comprising:
rejecting the command in response to the indicator indicating that the set of one or more computer memory locations is not busy and the head tag being not equal to the predecessor tag.

* * * * *